C. M. COLE AND W. S. ADAMS.
FLUID GAGE.
APPLICATION FILED JUNE 15, 1917. RENEWED AUG. 12, 1919.
1,355,939.
Patented Oct. 19, 1920.
2 SHEETS—SHEET 1.
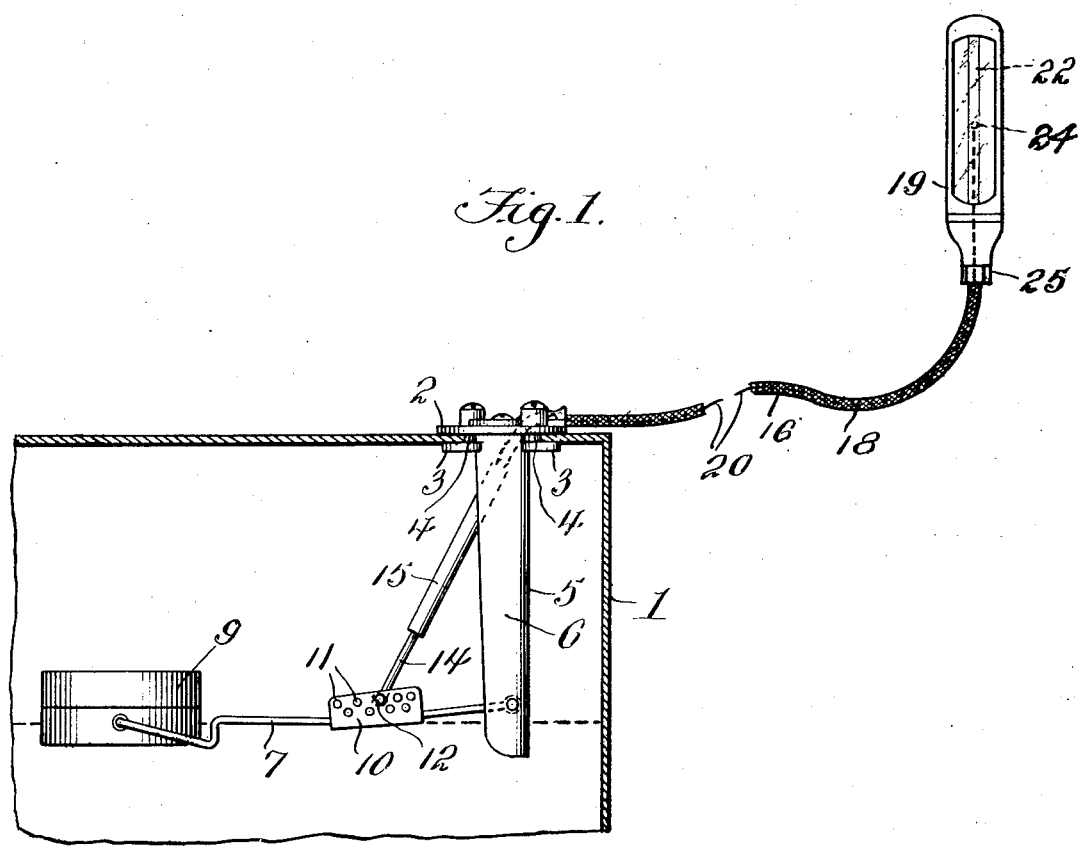
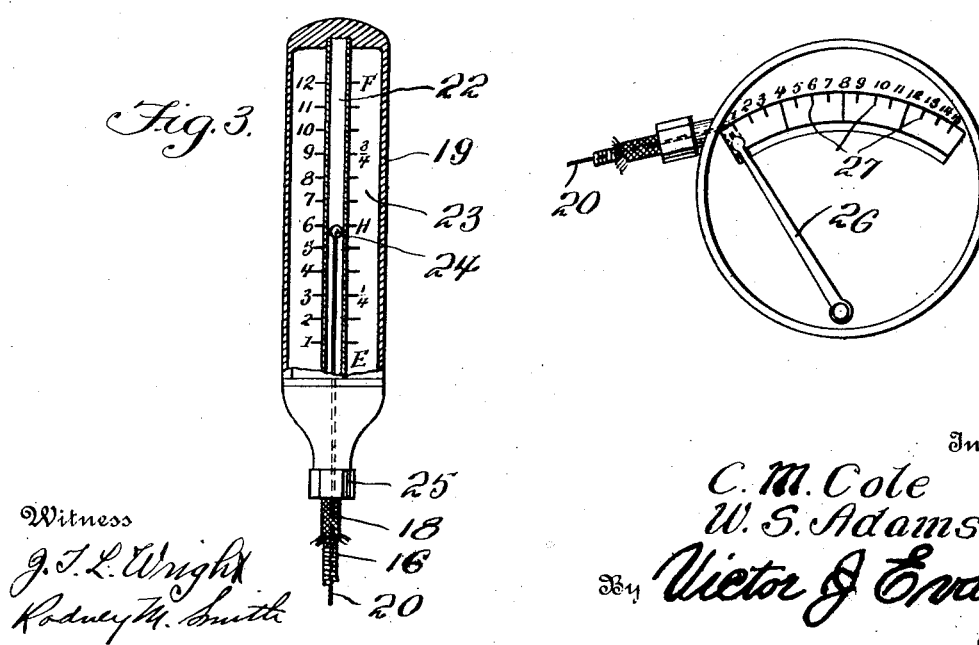
Inventor
C. M. Cole
W. S. Adams
By Victor J. Evans
Attorney

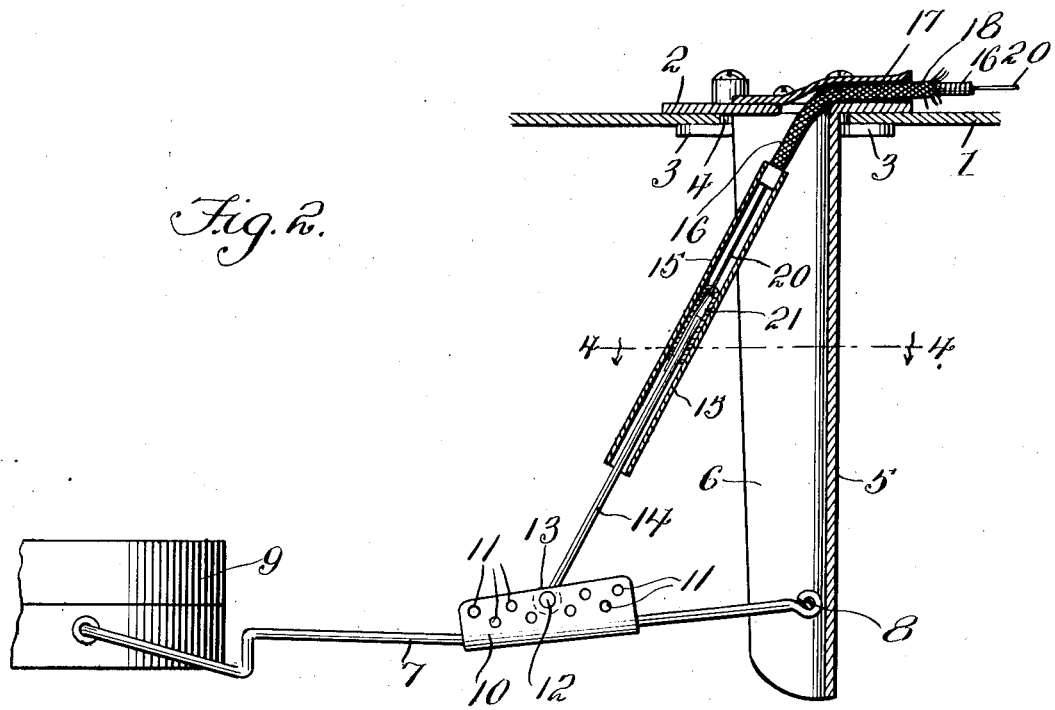

UNITED STATES PATENT OFFICE.

CLIFFORD M. COLE, OF DAYTON, OHIO, AND WILLIAM S. ADAMS, OF CHICAGO, ILLINOIS.

FLUID-GAGE.

1,355,939.  Specification of Letters Patent.  Patented Oct. 19, 1920.

Application filed June 15, 1917, Serial No. 174,961. Renewed August 12, 1919. Serial No. 317,101.

*To all whom it may concern:*

Be it known that we, CLIFFORD M. COLE and WILLIAM S. ADAMS, citizens of the United States, residing at Dayton and Chicago, in the counties of Montgomery and Cook and States of Ohio and Illinois, have invented new and useful Improvements in Fluid-Gages, of which the following is a specification.

This invention relates to fluid gages and comprehends particularly the provision of a gage for gasolene and has for one of its objects to provide a simple and practical gage which will register the height of liquid in a tank.

Another object of the invention resides in the provision of a gage adapted to be inserted in the gasolene tank of a motor vehicle irrespective of the position of said tank and to register on an indicator attached to the instrument board or other clearly visible place, the amount of gasolene in the tank.

Another object of the invention is to provide an adjustable gage for this purpose having a float operated lever which controls by means of a flexible wire an indicator, the wire being connected to the lever by an adjustable means.

The invention also aims to generally improve devices of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a side elevation of the gage complete showing a portion of a gasolene tank.

Fig. 2 is an edge elevation partly in section of that portion of the gage carried by the tank.

Fig. 3 is a face view partly in section showing one form of the indicator.

Fig. 4 is a horizontal section on the plane of line 4—4 of Fig. 2.

Fig. 5 is a side elevation of a modified form of indicator.

Fig. 6 is a detail plan view of the cover plate 2 and related parts. Fig. 7 is a perspective detail view of one of the clamping disks and a portion of the stem connected therewith. Fig. 8 is a sectional detail view showing the connection of the rod 14 with a wire 20.

Referring in detail to the drawings by numerals, 1 designates a portion of the gasolene tank having an opening in the top thereof over which is secured a base or cover plate 2 forming a portion of my improved gage. The plate may be secured to the tank by any suitable means such as the eccentric clamping disks 3 mounted on the headed stems or shanks 4 and rotatable thereby. Depending from the cover plate 2 is a sheath or housing 5 which is U shaped in cross section having the parallel side walls 6.

A lever 7 is fulcrumed as at 8 between the walls of the housing adjacent their lower ends and has secured to its free terminal a float 9 of any suitable design and construction. Secured to the lever intermediate its ends is an attaching sheath or housing 10 U shaped in cross section and formed with a plurality of openings 11 arranged in registering pairs. A bolt 12 or other fastener may be mounted in any pair of openings 11 and has connected to it by means of the eye 13 a rod 14 which extends upwardly into a tubular guide 15 which projects at its upper end into the housing 5 and is connected at its upper terminal to a flexible tube 16. A retaining plate 17 connects the tube to the cover plate 2 as shown. A cover or wrapping 18 encircles the flexible tube between the cover plate and the indicator 19.

A wire 20 is connected at one end to the rod 14 by a tubular cap 21. The wire extends into the closed end of the cap and is clamped by the walls of the cap against the rod. This is a convenient attaching means, since it permits of the wire being easily taken up or let out to attain a proper setting of the indicator. The wire runs through the tubular guide 15 and flexible tube 16 to the indicator 19 and projects into a glass sight tube 22 forming a part of the indicator. The sight tube is carried on a base or backing plate 23 which is guarded as shown and the terminal of the wire is provided with an indicating element 24. A nut 25 connects the flexible tube 16 to the indicator.

The flexible tube 16 adjacent its point of connection to the guide 15 acts as a hinge or pivot for the latter allowing it to oscillate as the float rises and falls. This is a unique feature of the device and one of essential importance since it obviates the necessity of separate pivoting for the guide 15 and reduces the number of parts, and the cost to manufacture by making the flexible tubing serve the double function of a hinge for the guide 15 and a housing for the wire 20. As the float drops, the rod 14 pulls the wire 20 causing the indicating element 24 to lower with respect to the graduations and, therefore, it will be seen that the height of liquid in the tank may be told by a glance at the indicator. By an adjustment of the point of attachment of the rod 14 to the sheath 10, the gage may be accommodated to tanks of different diameters so that the indicator will always register properly.

In Fig. 5, I have shown a different form of indicating means wherein the wire 20 actuates a swinging pointer 26 rotatable over the graduations 27. Other forms of indicators than the two shown may be used in connection with the gage proper.

From the foregoing description taken in connection with the accompanying drawings it will be seen that we have provided a very practical, adjustable float gage for fluids by means of which the quantity of fluid in a tank may be instantly ascertained by a glance at the indicator.

While we have shown and described the preferred embodiment of our invention, it will be clearly understood that we do not wish to be limited to this construction, but may make such changes as will fall within the scope and spirit of the invention as claimed.

What we claim is:

1. In a fluid gage, a depending housing, means for supporting said housing in a tank, a float actuated lever fulcrumed in said housing, a rod pivotally connected to said lever, and a flexible connection secured to said rod.

2. In a fluid gage, a depending housing adapted to be positioned within a tank, a float operated lever fulcrumed at one end in said housing, a rod pivotally connected to said lever, a guide into which said rod extends, means yieldingly supporting said guide for oscillatory movement within the housing and a flexible connection adjustably secured to said rod.

3. In a fluid gage, a depending housing, a float controlled lever fulcrumed in said housing, a rod pivotally connected to said lever, a tubular guide for said rod, a flexible tube connected to said guide and to the housing and a flexible wire connected to said rod and extending through the guide and flexible tube.

4. A fluid gage comprising a depending housing U-shaped in cross section, means for supporting said housing in a tank, a float controlled lever fulcrumed within said housing, a rod pivotally connected to said lever, a tubular guide in which said rod is operative, said guide extending at its upper end into the housing, a flexible tube connected to the upper end of said guide, means securing said flexible tube to the housing, an indicator, a wire connected to the rod and extending through said flexible tube and indicator, and an indicating element connected to one end of said wire and operable within the indicator.

5. A rod, a wire and a tubular cap connecting said wire to the rod, the wire extending into the cap through the closed end thereof and being clamped by the cap against the rod.

6. A fluid gage wherein the rise and fall of a float in a tank is indicated at a distant point by the to and fro movement of an intermediate reciprocatory flexible member acting through a curvilinear path of travel under the influence of the float, characterized by a movable guide element for said reciprocatory member conforming to the variations of movement of the float.

7. A fluid gage wherein the rise and fall of a float in a tank is indicated at a distant point by the to and fro movement of an intermediate flexible reciprocatory member acting through a curvilinear path of travel under the influence of the float, characterized by an oscillatory guide element for said reciprocatory member moving in unison with the movement of the float.

8. A fluid gage wherein the rise and fall of a float in a tank is indicated at a distant point by the to and fro movement of an intermediate flexible reciprocatory member acting through a curvilinear path of travel under the influence of the float, characterized by means for varying the extent of the stroke of flexible reciprocatory member in relation with that of the float.

9. A fluid gage wherein the rise and fall of a float in a tank is indicated at a distant point by the to and fro movement of an intermediate flexible reciprocatory member acting through a curvilinear path of travel under the influence of the float, characterized by means for varying the limits of the stroke of said reciprocatory member without necessarily varying the length of such stroke.

10. A fluid gage wherein the rise and fall of a float in a tank is indicated at a distant point by the to and fro movement of an intermediate flexible reciprocatory member acting through a curvilinear path of travel under the influence of the float, characterized by indicating means at the distant point of indication with which the reciprocatory member coacts to measure the rise and fall of the float, said indicating means being adjustable in relation with the reciprocatory member to enable the correction of irregularities of measurement.

11. A fluid gage wherein the rise and fall of a float in a tank is indicated at a distant point by the to and fro movement of an intermediate flexible reciprocatory member acting through a curvilinear path of travel under the influence of the float, characterized by a fitting located at the distant point having thereon a graduated scale, an indicator controlled by said reciprocatory member, said fitting being movable in the general direction of movement of the reciprocatory member but independent thereof to vary the relation of the controlled indicator and the graduated scale independent of the movement of the reciprocatory member to synchronize the indications with the position of the float within the tank.

12. A fluid gage wherein the rise and fall of a float in a tank is indicated at a distant point by the to and fro movement of an intermediate flexible reciprocatory member acting through a curvilinear path of travel under the influence of the float, characterized by a closure head fitted to the wall of the tank upon supporting and guiding means for the float carried by said closure head, and a plurality of revoluble attachment members carried by the closure head, said revoluble attachment members having eccentric heads movable into and out of engagement with the wall of the tank by the rotation of said members.

13. A fluid gage wherein the rise and fall of a float in a tank is indicated at a distant point by the to and fro movement of an intermediate reciprocatory flexible member acting through a curvilinear path of travel under the influence of the float, characterized by a pivoted float carrying arm, and a buoyant body pivoted to said arm for oscillatory movement about a horizontal axis located at the center of the buoyant body both as to perpendicular and transverse dimensions.

In testimony whereof we affix our signatures.

CLIFFORD M. COLE.
WILLIAM S. ADAMS.